(12) United States Patent
Miura et al.

(10) Patent No.: US 7,110,543 B2
(45) Date of Patent: Sep. 19, 2006

(54) CONTENT MANAGEMENT SYSTEM, CONTENT MANAGEMENT TERMINAL, USAGE RULE MANAGEMENT SERVER, CONTENT MANAGEMENT METHOD, AND CONTENT MANAGEMENT PROGRAM

(75) Inventors: Koji Miura, Matsubara (JP); Stefan Walter, Moriguchi (JP); Masaya Yamamoto, Hirakata (JP)

(73) Assignee: Matsushita Electric Industrial Co., Ltd, Osaka-fu (JP)

( * ) Notice: Subject to any disclaimer, the term of this patent is extended or adjusted under 35 U.S.C. 154(b) by 773 days.

(21) Appl. No.: 10/151,031

(22) Filed: May 21, 2002

(65) Prior Publication Data

US 2002/0178376 A1    Nov. 28, 2002

(30) Foreign Application Priority Data

May 22, 2001    (JP) .............................. 2001-152059

(51) Int. Cl.
*H04N 7/167*    (2006.01)
*H04K 1/00*    (2006.01)
*H04L 9/32*    (2006.01)
*G06F 11/30*    (2006.01)
*H04L 9/00*    (2006.01)

(52) U.S. Cl. ...................... 380/201; 713/193; 380/231; 380/232; 380/233; 380/277

(58) Field of Classification Search ................ 380/277, 380/201, 231–233; 713/193
See application file for complete search history.

(56) References Cited

U.S. PATENT DOCUMENTS 5,629,980 A * 5/1997 Stefik et al. .................. 705/54
5,699,428 A * 12/1997 McDonnal et al. ......... 713/165
5,920,861 A 7/1999 Hall et al.
6,389,402 B1 * 5/2002 Ginter et al. .................. 705/51
6,513,117 B1 * 1/2003 Tarpenning et al. ......... 713/156
6,857,071 B1 * 2/2005 Nakae .......................... 713/156

FOREIGN PATENT DOCUMENTS

JP    7-131452    5/1995

(Continued)

OTHER PUBLICATIONS

Schupack et al, "Question about CD-R's and SCMS" Mar. 28, 1999. Reply by 'TheChips' posted on Apr. 2, 1999.*

(Continued)

*Primary Examiner*—Ayaz Sheikh
*Assistant Examiner*—Shin-Hon Chen
(74) *Attorney, Agent, or Firm*—Wenderoth, Lind & Ponack, L.L.P.

(57) ABSTRACT

At the time of moving a content from an e-book content receiving terminal 102 to a copyright protection medium 103, from among a plurality of usage rules set to the content, those defined by the copyright protection medium 103 is moved to the copyright protection medium 103 by a content moving section 106, and those not defined by the copyright protection medium 103 are transmitted to a usage rule management server 104 via a communications section 105. On the other hand, at the time of moving the content from the copyright protection medium 103 to the e-book content receiving terminal 102, the usage rules from the copyright protection medium 103 and the usage rules from the usage rule management server 104 are combined together. In this manner, even when a content is moved through a copyright protection medium in a which usage rules of the content are not fully defined therein, none of the usage rules is lost.

15 Claims, 11 Drawing Sheets

FOREIGN PATENT DOCUMENTS

| | | |
|---|---|---|
| JP | 2000-048076 | 2/2000 |
| WO | 97/14087 | 4/1997 |

OTHER PUBLICATIONS

M. Kazuo, K. Fujimura. "Distributed Digital-Ticket Management for Rights Trading System" In Proceedings of the 1st ACM Conference on Electronic Commerce (Denver, Colorado, United States, Nov. 3-5, 1999). EC '99. ACM Press, New York, NY, 110-118.*

"SDMI Secure Digital Music Initiative", SDMI Portable Device Specification, XP-000997330, Version, 1.0, XX, XX, No. Part 1, Version 1.0, Jul. 8, 1999, pp. 1-35.

* cited by examiner

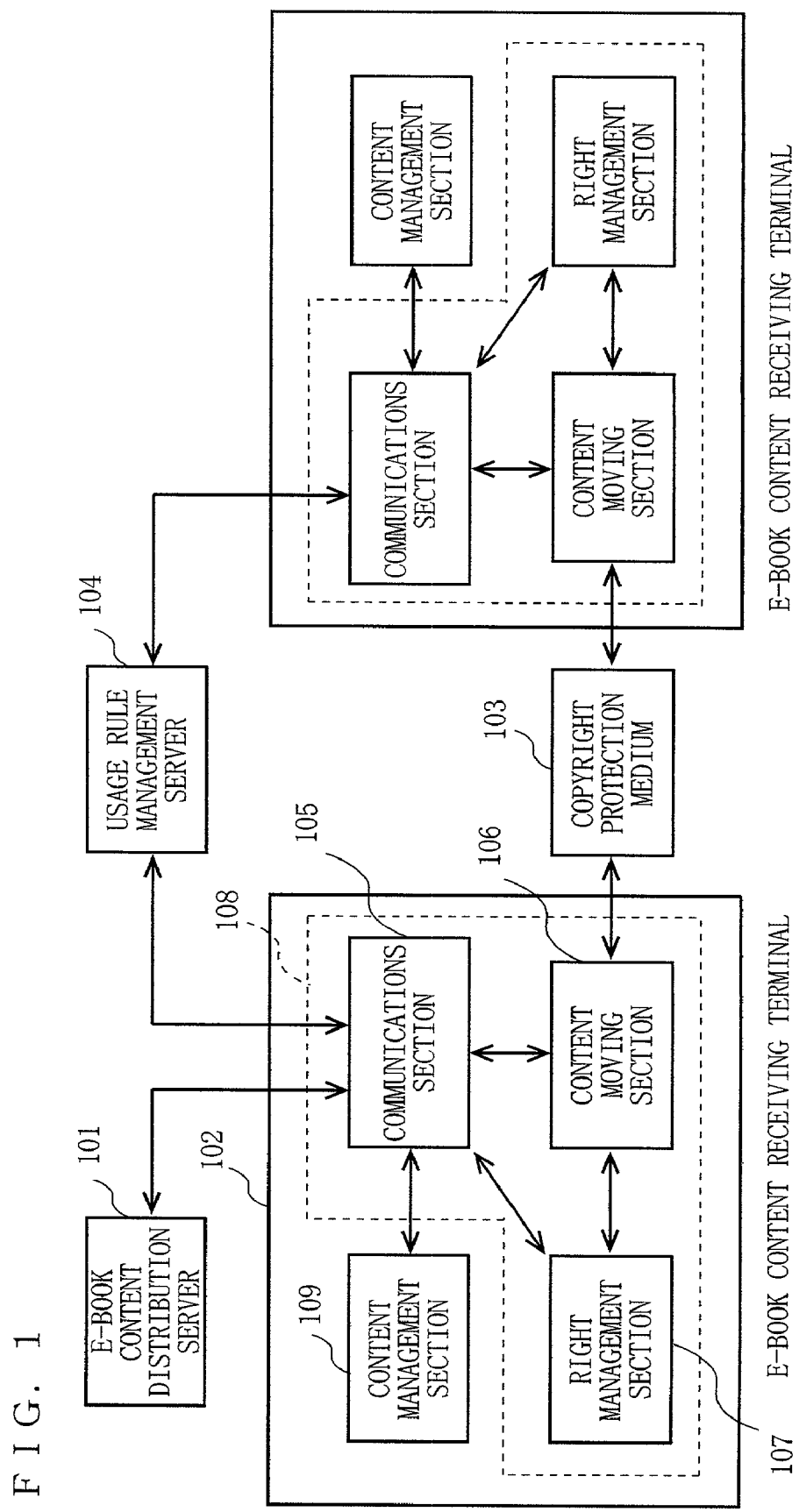

FIG. 2A

| CONTENT IDENTIFIER | 758AE14183A711D4A988005004F2F7FB | | 201 |
|---|---|---|---|
| USAGE RULE SET | 0001 | 20010421 | 202 |
| | 0002 | 000000FF | |
| | 0003 | 00000001 | |
| CONTENT KEY | 015BC32711EEBD3A56429027BDEA2751 | | 203 |

EXEMPLARY FORMAT OF LICENSE TICKET

FIG. 2B

| USAGE RULE | USAGE RULE IDENTIFIER |
|---|---|
| EXPIRATION DATE | 0001 |
| YES OR NO FOR PRINTING | 0002 |
| YES OR NO FOR CONTENT MOVING | 0003 |

EXAMPLE OF USAGE RULE IDENTIFIER

FIG. 3

| CONTENT IDENTIFIER | FILE NAME |
|---|---|
| 758AE14183A711D4<br>A988005004F2F7FB | D:/Contents/Books/StarTreck.SB1 |
| 758AE14183BBEC11<br>0000ABFD76565799 | D:/Contents/Books/GoneWithWind.SB1 |
| ······ | |

FIG. 4A

| CONTENT KEY | USAGE RULE SET | CONTENT IDENTIFIER |
|---|---|---|
| 015BC32711EEBD3A<br>56429027BDEA2751 | UR1 | 758AE14183A711D4<br>A988005004F2F7FB |
| ······ | | |

FIG. 4B

| USAGE RULE SET | USAGE RULE IDENTIFIER | ATTRIBUTE VALUE |
|---|---|---|
| UR1 | 0001 | 20010421 |
| UR1 | 0002 | 000000FF |
| UR1 | 0003 | 00000001 |

F I G. 5

| USAGE RULE IDENTIFIER (DISTRIBUTION SERVICE) | USAGE RULE IDENTIFIER (MEDIA) | FUNCTION OF ATTRIBUTE CONVERSION (SERVICE→MEDIA) | FUNCTION OF ATTRIBUTE CONVERSION (MEDIA→SERVICE) |
|---|---|---|---|
| 0001 | 00008000 | F1 | F2 |
| 0002 | 00009000 | F3 | F4 |
| ⋮ | | | |

FIG. 6A

| RETRIEVAL KEY | USAGE RULE SET | CONTENT IDENTIFIER |
|---|---|---|
| AA3299FE01216751<br>6D73A7DD73268391 | UR1 | 758AE14183A711D4<br>A988005004F2F7FB |
| 99756567DFBA0123<br>19386237DD7A376D | UR2 | 24A2414463DED245<br>BA80440F50F2FCDD |
| . . . . . . . | | |

FIG. 6B

| USAGE RULE SET | USAGE RULE IDENTIFIER | ATTRIBUTE VALUE |
|---|---|---|
| UR1 | 0003 | 00000001 |
| UR2 | 0003 | 00000000 |
| UR2 | 0004 | 000000FF |
| . . . . . . . | | |

F I G. 8
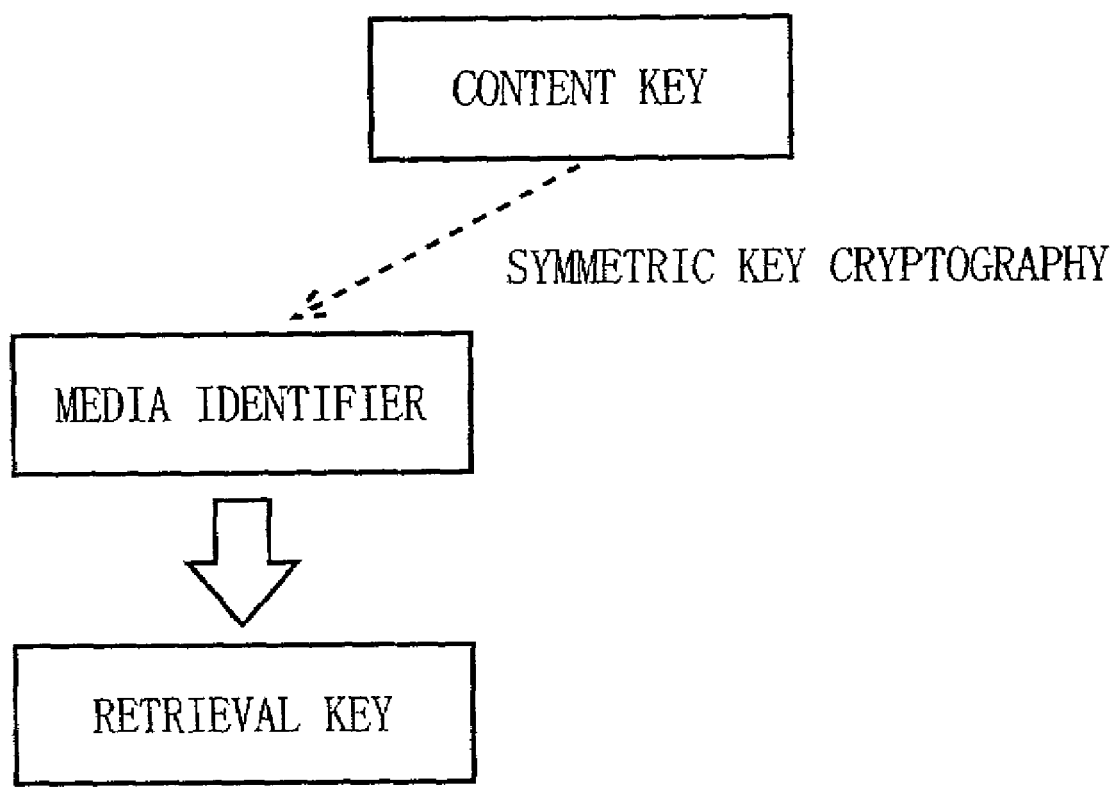

CONTENT MANAGEMENT SYSTEM, CONTENT MANAGEMENT TERMINAL, USAGE RULE MANAGEMENT SERVER, CONTENT MANAGEMENT METHOD, AND CONTENT MANAGEMENT PROGRAM

BACKGROUND OF THE INVENTION

1. Field of the Invention

The present invention relates to content management systems and, more specifically, to a content management system in which content and its usage rules under management of a certain content management terminal are temporarily moved to an intermediate system, and then moved back to the same content management terminal or moved to any other content management terminal.

2. Description of the Background Art

In recent years, after the progress of the technology for digital information compression and the appearance of the high-speed network infrastructure, various content distribution services have become available over the network such as the Internet. As exemplary services, there are a music distribution service for distributing music contents from Web pages, and a market information distribution service utilizing e-mails.

Generally, digital contents are easy to duplicate so that content management plays a key role especially in content distribution services which involve a billing process. Unauthorized duplication and tampering cause a huge loss to service providers and copyright holders. Japanese Patent Laid-Open Publication No. 7-131452 (1995-131452) discloses an exemplary copyright management system considering unauthorized duplication and tampering. In the content management method disclosed therein, a terminal receives encrypted content, its usage rules, and its decryption key, and after tampering detection, starts verifying the appropriateness of the usage rules. Only when the verification turns out to be completely satisfactory, the content is decrypted and outputted.

Here, the usage rules are information to limit the use of the content, and specify the number of uses, expiration date, and others. Specifying the expiration date enables the content distribution service providers to offer rental services, and setting up the usage rules enables the providers to change the price setting depending thereon, realizing the wide range of services. In view of these advantages, the content distribution services are often provided under such usage rules.

Further, recording media (hereinafter, referred to as copyright protection media), exemplified by DVDs and SD cards, incorporating a copyright protection mechanism have been recently developed, and contents recorded on such media become free from unauthorized duplication. Therefore, some service providers who offer content distribution services have started allowing distribution contents to be moved to the copyright protection media. Here, "moving the content" means an "operation of moving content together with its usage rules from A to B, and after the completion of movement, the content is not left available for A." That is, the service providers have started allowing contents to be moved to the copyright protection media because no content is duplicated thereby.

The contents moved to the copyright protection media are available through output (reproduction) units which are specifically for the copyright protection media. This makes contents obtained from the service providers and then recorded on stay-at-home units also available through portable units, whereby content usability for users is increased.

Here, the contents temporarily moved to the copyright protection media are not always used by the output (reproduction) units specifically designed for the copyright protection media. For example, after moved to the copyright protection media, the contents may be used again by the stay-at-home units, from which those are originally moved. For use in the portable units during commuting hours and then in personal computers during office hours, the contents may be moved from the stay-at-home units to the copyright protection media, and then to the personal computers. In some other cases, the copyright protection media may be used as a mere vehicle for moving content data between stay-at-home units. The content data may be transferred to other users via the copyright protection media.

The issue here is that, during such cases, the usage rules which have been originally set to the contents may be lost. This is because the copyright protection media do not share the same usage rules. In the below, described in detail is how the usage rules are lost.

Exemplified here is a case where an e-book content purchased through an e-book distribution service A is the one to be moved. Assuming that the e-book distribution service A attaches every selling e-book content with three usage rules (expiration date, Yes or No for printing, Yes or No for content moving). The users use e-book contents purchased through receiving terminals under the usage rules coming therewith. Assuming that a user purchased an e-book content C whose usage rules are (expiration date="Apr. 21, 2001", Yes or No for printing="Yes", Yes or No for content moving="YES"), he/she is entitled to read the purchased e-book content C at any time before Apr. 21, 2001, and is at liberty to make printouts thereof. The user is also authorized for content moving, whereby the e-book content C recorded on his/her stay-at-home unit can be moved to his/her own copyright protection medium M to read the e-book content C through an e-book reader unit.

Here, presumably, the usage rule defined by an e-book storage format F on the copyright protection medium M is only (expiration date). This tells that the format F on the copyright protection medium M is not designed with printing by the e-book reader units in mind. Thus, the user cannot make printouts of the e-book content C in the medium M by the e-book reader unit, but is at liberty to read it at any time until Apr. 21, 2001.

There occurs a problem if the user tries to move the e-book content C in the medium M to some other units (e.g., unit from which the content originally came, or other units). This is because the medium M includes no usage rule concerning Yes or No for printing. Therefore, moving the content via the medium M will resultantly lose the usage rule concerning Yes or No for printing. That is, even if a destination terminal is designed for printing of the e-book content C, no such usage rule concerning printing comes from the medium M. Therefore, the destination terminal cannot make printouts of the e-book content C.

Such a problem surely makes the users cautious and wary of moving e-book contents to the copyright protection media, and if seeing any possibility of making printouts of the contents, the users may give up reading those through portable e-book reader units. This resultantly impairs the portability and usability of the contents. This problem also arises when the copyright protection media are used as a mere vehicle for moving the content data. As a result, the portability and usability of the copyright protection media are not fully utilized, and the users will find those not worth using.

Such a problem is not particular only to the case of moving contents via the copyright protection media, and more generally, becomes apparent when the contents are moved through a system in which their usage rules are not fully defined.

SUMMARY OF THE INVENTION

Therefore, an object of the present invention is to provide a content management system which avoids loss of usage rules of content even when the content is moved through a system (typically a copyright protection medium) in which its usage rules are not fully defined.

To achieve the above object, the present invention has the following aspects.

A first aspect of the present invention is directed to a content management system in which content and usage rules thereof under management of a certain content management terminal are temporarily moved to an intermediate system, and then moved back to the same contentmanagement terminal or moved to any other content management terminal, the content management system comprising:

the content management terminal; and a usage rule holding region operable to temporarily hold any of the usage rules which are not defined by the intermediate system, wherein the content management terminal includes:

a content management section operable to manage the content;

a right management section operable to manage the usage rules of the content;

a content moving section operable to move the content under management of the content management section to the intermediate system, and from among the usage rules of the content, move any of the usage rules defined by the intermediate system to the intermediate system; and a usage rule moving section operable to move, to the usage rule holding region, from among the usage rules of the content to be moved by the content moving section, at least any of the usage rules which are not defined by the intermediate system, and the content management terminal to which the content is moved from the intermediate system acquires the usage rules of the content based on the usage rule moved from the intermediate system and the usage rule held in the usage rule holding region.

As described above, in the first aspect, no usage rule is lost even if content and its usage rules under management of a certain content management terminal are temporarily moved to an intermediate system, and then moved back to the same content management terminal or moved to any other content management terminal. Here, the "intermediate system" denotes such a system that the usage rules are defined therein independently from the content management terminal, e.g., a portable recording medium, a content management system, a content distribution system.

According to a second aspect, in the first aspect, the intermediate system is a portable recording medium.

According to a third aspect, in the first aspect, the usage rule holding region is a usage rule management server which is connected with the content management terminal over a network, and the usage rule moving section is a communications section which is provided with secure communications function with the usage rule management server.

As described above, in the third aspect, any usage rules which are not defined by the intermediate system can be securely held by the usage rule management server.

According to a fourth aspect, in the second aspect, the usage rule holding region is a storage region of the portable recording medium.

As described above, in the fourth aspect, any usage rules which are not defined by a portable recording medium are moved to the portable recording medium together with the content. Accordingly, even if the content management terminal is not connected to a network, no usage rule is lost.

According to a fifth aspect, in the fourth aspect, the storage region of the portable recording medium includes a secret region which is accessible only when mutual authentication is through with the portable recording medium, and a normal region which is accessible without the mutual authentication, the usage rule holding region is the normal region of the portable recording medium, and the usage rule moving section is a usage rule data moving section which encrypts at least any of the usage rules which are not defined by the portable recording medium, and moves the encrypted result to the normal region as usage rule data.

As described above, in the fifth aspect, any usage rules which are not defined by the intermediate system are securely held in the normal region on the portable recording medium.

According to a sixth aspect, in the fourth aspect, the storage region of the portable recording medium includes a secret region which is accessible only when mutual authentication is through with the portable recording medium, and a normal region which is accessible without the mutual authentication, the usage rule holding region is the secret region of the portable recording medium, and the usage rule moving section is a usage rule data moving section which moves, to the secret region, at least any of the usage rules which are not defined by the portable recording medium.

As described above, in the sixth aspect, any usage rules which are not defined by the intermediate system are securely held in the secret region on the portable recording medium.

A seventh aspect of the present invention is directed to a content management terminal used in a content management system, in which content and usage rules thereof under management of a certain content management terminal are temporarily moved to an intermediate system, and then moved back to the same content management terminal or moved to any other content management terminal, the content management terminal comprising:

a content management section operable to manage the content;

a right management section operable to manage the usage rules of the content;

a content moving section operable to move the content under management of the content management section to the intermediate system, and move any of the usage rules defined by the intermediate system to the intermediate system; and a usage rule moving section operable to move, to the usage rule holding region in which the usage rules are held temporarily, from among the usage rules of the content to be moved by the content moving section, at least any of the usage rules which are not defined by the intermediate system, wherein the content management terminal acquires the usage rules of the content based on the usage rule moved from the intermediate system and the usage rule held in the usage rule holding region.

As described above, in the seventh aspect, no usage rule is lost even if content and usage rules thereof under management of a certain content management terminal are temporarily moved to an intermediate system, and then moved back to the same content management terminal or moved to any other content management terminal.

An eighth aspect of the present invention is directed to a usage rule management server used in a content management system, in which content and usage rules thereof under management of a certain content management terminal are temporarily moved to an intermediate system, and then moved back to the same content management terminal or moved to any other content management terminal, the usage rule management server being connected with the content management terminal over a network, and comprising:

a database registration section operable to receive, under secure communications, from among the usage rules of the content to be moved by the content management terminal, at least any of the usage rules which are not defined by the intermediate system, and register the usage rules in a database; and a database retrieval section operable to search the database in response to a request coming from the content management terminal to which the content is moved from the intermediate system, and notify the retrieval result to the content management terminal.

As described above, in the eighth aspect, when content and usage rules thereof under management of a certain content management terminal are temporarily moved to an intermediate system, and then moved back to the same content management terminal or moved to any other content management terminal, any usage rules which are not defined by the intermediate system can be securely held.

A ninth aspect of the present invention is directed to a content management method in which content and usage rules thereof under management of a certain content management terminal are temporarily moved to an intermediate system, and then moved back to the same content management terminal or moved to any other content management terminal, the content management method comprising:

a content management step of managing the content in the content management terminal;

a right management step of managing the usage rules of the content in the content management terminal;

a content moving step, in the content management terminal, of moving the content managed in the content management step to the intermediate system, and from among the usage rules of the content, moving any of the usage rules defined by the intermediate system to the intermediate system;

a usage rule moving step of moving, in the content management terminal, from among the usage rules of the content to be moved in the content moving step, to a usage rule holding region, at least any of the usage rules which are not defined by the intermediate system;

a usage rule holding step of temporarily holding, in the usage rule holding region, any of the usage rules which are not defined by the intermediate system; and a step of acquiring, in the content management terminal to which the content is moved from the intermediate system, the usage rule moved from the intermediate system and the usage rule held in the usage rule holding region.

As described above, in the ninth aspect, no usage rule is lost even if content and usage rules thereof under management of a certain content management terminal are temporarily moved to an intermediate system, and then moved back to the same content management terminal or moved to any other content management terminal.

According to a tenth aspect, in the ninth aspect, the intermediate system is a portable recording medium.

According to an eleventh aspect, in the ninth aspect, the usage rule holding region is a usage rule management server which is connected with the content management terminal over a network, and the usage rule moving step moves, under secure communications, to the usage rule management server, at least any of the usage rules which are not defined by the intermediate system.

According to a twelfth aspect, in the tenth aspect, the usage rule holding region is a storage region of the portable recording medium.

According to a thirteenth aspect, in the twelfth aspect, the usage rule holding region is a normal region of the portable recording medium, and the usage rule moving step encrypts at least any of the usage rules which are not defined by the portable recording medium, and moves the encrypted result as usage rule data to the normal region.

According to a fourteenth aspect, in the twelfth aspect, the usage rule holding region is a secret region of the portable recording medium, and the usage rule moving step moves, to the secret region, at least any of the usage rules which are not defined by the portable recording medium.

A fifteenth aspect of the present invention is directed to a content management program executed by a content management terminal in which content and usage rules thereof under management of a certain content management terminal are temporarily moved to an intermediate system, and then moved back to the same content management terminal or moved to any other content management terminal, the content management program comprising:

a content management step of managing the content;

a right management step of managing the usage rules of the content;

a content moving step of moving the content managed in the content management step to the intermediate system, and from among the usage rules of the content, moving any of the usage rules which are defined by the intermediate system to the intermediate system, a usage rule moving step of moving, to a usage rule holding region, from among the usage rules of the content to be moved in the content moving step, at least any of the usage rules which are not defined by the intermediate system, and a step of acquiring the usage rule moved from the intermediate system, and the usage rule held in the usage rule holding region.

As described above, in the fifteenth aspect, no usage rule is lost even if content and usage rules thereof under management of a certain content management terminal are temporarily moved to an intermediate system, and then moved back to the same content management terminal or moved to any other content management terminal. Here, the content management program may be supplied to the content management terminal in the state embodied on a recording medium, or supplied thereto over a communications line.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a content management system according to a first embodiment of the present invention;

FIGS. 2A and 2B are diagrams showing exemplary ticket formats;

FIG. 3 is a diagram showing an exemplary database of a content management section;

FIGS. 4A and 4B are diagrams showing exemplary databases of a right management section;

FIG. 5 is a diagram showing an exemplary conversion table of a content moving section;

FIGS. 6A and 6B are diagrams showing exemplary usage rule databases of a usage rule management server;

FIG. 8 is a schematic process flow diagram of generating a retrieval key;

DESCRIPTION OF THE PREFERRED EMBODIMENTS

Figure 7:
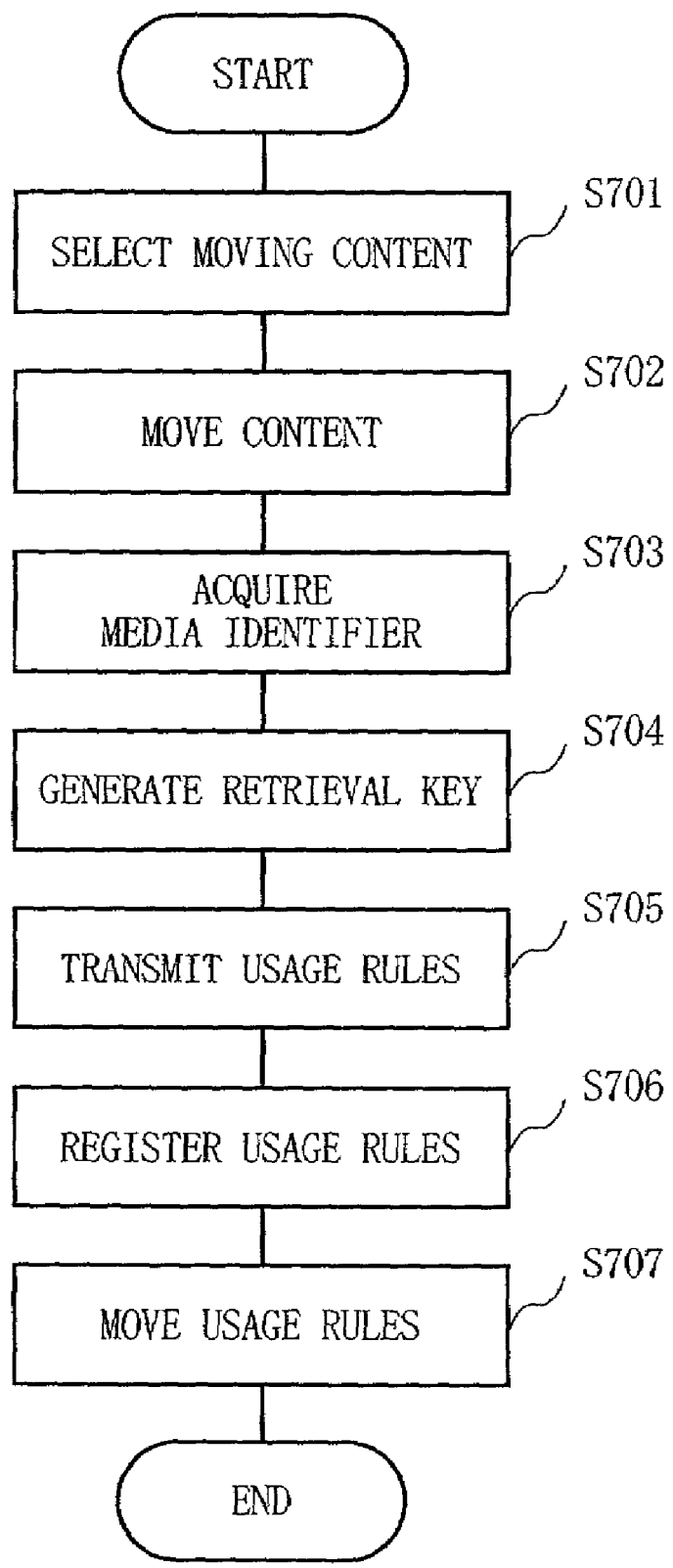
FIG. 7 is a flowchart showing the operation at the time of content moving to a copyright protection medium of the first embodiment.

Referring to the accompanying drawings, embodiments of the present invention are described below.

First Embodiment

FIG. 1 is a block diagram showing the structure of a content management system according to a first embodiment of the present invention. In FIG. 1, the content management system includes an e-book content distribution server 101, an e-book content receiving terminal 102, a copyright protection medium 103, and a usage rule management server 104. The e-book content receiving terminal 102 includes a confidential process section 108, and a content management section 109, and the confidential process section 108 includes a communications section 105, a content moving section 106, and a right management section 107. The operations of those constituents are respectively described below.

<E-book Content Distribution Server 101>

In response to a content request coming from the e-book content receiving terminal 102, the e-book content distribution server 101 transmits the corresponding content to the e-book content receiving terminal 102. Here, to the e-book content receiving terminal 102, the e-book content distribution server 101 may distribute the content by means of broadcasting, or over the network such as the Internet. Assuming here that distribution contents are all protected by copyright, and accompanying usage rules. Further, those contents are each provided with a content identifier for unique identification.

<Copyright Protection Scheme in Content Distribution Services>

For copyright protection, the following scheme is an option. First, an e-book content is encrypted using symmetric key cryptography by a secret key kc which is uniquely assigned thereto, and forwarded to the e-book content receiving terminal 102. The secret key Kc is referred to as a content key. In the e-book content receiving terminal 102, a public key assigned thereto is used to decrypt a content identifier Ic, the content key Kc, and content usage rules Uc using a symmetric key cryptography. The encrypted result is referred to as a ticket Tc. The secret key Kc for decrypting the content is included in the ticket Tc so that using the content requires the ticket Tc. The ticket Tc is forwarded to the e-book content receiving terminal 102 after a content purchase process is completed. The e-book content receiving terminal 102 decrypts and stores the received ticket Tc in the right management section 107 located therein. The right management section 107 is located in the confidential process section 108 which is tamper resistant, and data stored therein is not accessible to the user.

As having been encrypted by the public key of the e-book content receiving terminal 102, the ticket Tc is decryptable only by the e-book content receiving terminal 102. Further, its decryption and storage are done in the confidential process section 108 of the e-book content receiving terminal 102, thus it remains unavailable for third parties, preventing unauthorized duplication.

The ticket Tc may be encrypted using symmetric key cryptography. If this is the case, the ticket Tc is still encrypted by the secret key of the e-book content receiving terminal 102, restricting decryption only by the e-book content receiving terminal 102.

Although the ticket Tc cannot be obtained without the content purchase process, the content is freely duplicable as having been encrypted. Thus, the content is not necessarily obtained from the e-book content distribution server 101, and may be transferred among users. This increases the speed of content distribution, and expands the distribution area.

<Specific Example of Ticket Tc>

FIG. 2A shows an exemplary format of the ticket Tc specifically for content. The ticket Tc includes information about the content, i.e., a content identifier 201, a usage rule set 202, and a content key 203. The usage rule set 202 includes a plurality of usage rules selected in advance from those predetermined. The usage rules are each provided, as shown in FIG. 2B, with a usage rule identifier. The usage rules are designated by each corresponding usage rule identifier. The usage rules are each assigned with an attribute value, which is defined by meaning on a usage rule basis. For example, about the usage rule "expiration date" corresponding to the usage rule identifier "0001", an attribute value assigned thereto is in BCD (Binary-Coded Decimal), indicating Year, Month, and Day of the expiration date (in FIG. 2A example, "20010421"). About the usage rule "Yes or No for printing" corresponding to the usage rule identifier "0002", its attribute value is 0 if No for printing, and if Yes, the allowed number of uses is assigned. About the usage rule "Yes or No for content moving" corresponding to the usage rule identifier "0003", its attribute value is 0 if the corresponding content is not movable to recording media and others, and if Yes, the allowed number of content moving is assigned.

<Confidential Process Section 108>

The confidential process section 108 is structured such that no information therein is accessible by users. Internal modules and data to be exchanged there among is kept secret from the users by applying a tampering-against process thereto. The confidential process section 108 is exemplified by an LSI as a result of integrating internal modules on a chip to be externally unprovable. The confidential process section 108 may be structured by a plurality of modules, and if so, those should be eavesdropping-resistant under secure communications.

<Communications Section 105>

The communications section 105 is a module onto which a network protocol is implemented for data exchange over the network, and is a part of the confidential process section 108 of the e-book content receiving terminal 102. The communications section 105 is implemented with a protocol with which usage rules are registerable and retrievable with respect to the usage rule management server 104. The protocols used for registering and retrieving the usage rules may be SSL (Secure Socket Layer) popular in the Internet. The SSL protocol is known by the technical material titled "The SSL protocol Version 3.0" of Netscape. Under the protocol, the e-book content receiving terminal 102 and the usage rule management server 104 authenticate each other, and exchange data therebetween through secure communications encrypted using a session key, which is the one assigned on a session basis. Here, SSL is not the only option for the protocol between the e-book content receiving terminal 102 and the usage rule management server 104, and any protocols will do, as long as functionally equal thereto or better.

<Content Management Section 109>

The content management section 109 manages the encrypted contents received from the e-book content distribution server 101. Those contents provided by the e-book content distribution server 101 are each assigned with a content identifier Ic for unique identification. The content management section 109 is realized by a database shown in FIG. 3, for example. In the management schema of FIG. 3, attributes are a content identifier Ic and a content filename, using as a retrieval key for specifying which content identifier.

<Right Management Section 107>

The right management section 107 is located in the confidential process section 108 of the e-book content receiving terminal 102, and manages the content key Kc, the usage rules Uc, and the content identifier Ic included in the ticket Tc received from the e-book content distribution server 101. Here, the usage rules Uc are those defined by the content distribution services. The above data is managed by the database in the right management section 107. For example, defined in the database are two schemas shown in FIGS. 4A and 4B. FIG. 4A shows a ticket schema for managing the set of the content key, the usage rule set, and the content identifier. FIG. 4B is a usage rule schema for managing the usage rules.

Here, In FIG. 4B example, the usage rule schema includes three usage rule identifiers corresponding to a usage rule set UR1. This means that defined for the usage rules of a certain content are three usage rule identifiers of 0001 (expiration date), 0002 (Yes or No for printing), and 0003 (Yes or No for content moving).

<Content Moving Section 106>

The content moving section 106 is located in the confidential process section 108 of the e-book content receiving terminal 102, and a function of which is to move, to the copyright protection medium 103, the content key Kc and the usage rules Uc stored in the right management section 107, and the encrypted content stored in the content management section 109. The content moving section 106 is provided with a correspondence table between the usage rules defined by the content distribution services and those defined by the copyright protection medium 103, and discriminates which usage rule(s) are to be moved, and performs format conversion. FIG. 5 shows an exemplary conversion table.

The conversion table of FIG. 5 includes, with respect to each of the usage rules to be moved to the copyright protection medium 103, the usage rule identifier defined by the content distribution services, the usage rule identifier defined by the copyright protection medium 103, and conversion functions of attribute data. For example, the usage rule "expiration date" whose usage rule identifier is "0001" in the content distribution services is also defined by the copyright protection medium 103, and shows YES for content moving. The usage rule identifier of the "expiration date" defined by the copyright protection medium 103 is "00008000". Further, the content distribution service and the copyright protection medium 103 each have a different data format for the attribute value of the usage rule "expiration date", i.e., the attribute value indicating the expiration date by Year, Month, and Day. In order to convert the data format indicating the expiration date, i.e., Year, Month, and Day, of the content distribution service to that of the copyright protection medium 103, used is a conversion function "F1". Conversion from the copyright protection medium 103 to the content distribution service uses a conversion function "F2". The usage rule "Yes or No for printing" whose usage rule identifier is "0002" in the content distribution service is defined also by the copyright protection medium 103, and shows Yes for content moving. The usage rule identifier of the usage rule "Yes or No for printing" in the copyright protection medium 103 is "00009000". Further, the content distribution service and the copyright protection medium 103 each have a different data format of the attribute value of the usage rule "Yes or No for printing", i.e., that of the attribute value indicating Yes or No for printing. In order to convert the data format indicating Yes or No for printing of the content distribution service to that of the copyright protection medium 103, used is a conversion function "F3". Conversion from the copyright protection medium 103 to the content distribution service uses a conversion function "F4".

The content moving section 106 is also provided with a function to move, to the e-book content receiving terminal 102, the content key Kc, usage rules Uc', and the corresponding content stored in the copyright protection medium 103. In this case as well, the conversion table of FIG. 5 is used. If there is a need to convert the data format of the attribute values of the usage rules Uc', used is the corresponding conversion function.

If the e-book content receiving terminal 102 and the copyright protection medium 103 are different in cryptography, the cryptography is accordingly converted by the content moving section 106.

<Copyright Protection Medium 103>

The copyright protection medium 103 is typically a semiconductor memory card such as an SD card, and is a portable recording medium with which a normal region and a secret region are both provided. The secret region becomes accessible only after mutual authentication is through between the copyright protection medium and the content management terminal. On the other hand, the normal region is always accessible without such an authentication process. The data in the secret region is not open to the users, and the content key Kc and the usage rules Uc' are stored therein. Here, the usage rules Uc' are those uniquely provided to the copyright protection medium 103. Contents are usually located in the normal region on the copyright protection medium 103. The normal region is always open to the users. The contents on the copyright protection medium 103 are each assigned with its own content identifier Ic', while the copyright protection medium 103 itself has an identifier Im for its unique identification.

In order to access the secret region of the copyright protection medium 103, used is a protocol which achieves mutual authentication and secure communications between the e-book content receiving terminal 102 and the copyright protection medium 103. That is, mutual authentication prevents impersonation, and secure communications prevents eavesdropping between the terminal and the medium.

<Usage rule Management Server 104>

The usage rule management server 104 is a database server located on the network, and manages the usage rules therein. FIGS. 6A and 6B show exemplary usage rule management schemas. The usage rule management server 104 is limited in access, and is accessible only by the e-book content receiving terminal 102 registered in the e-book distribution service. This is authenticated by a communications protocol between the communications section 105, as described in the foregoing. The following two processes are executed by the usage rule management server 104. (1) A set of (retrieval key, usage rules, and content identifier) is provided by the e-book content receiving terminal, and information relevant thereto is registered in the database provided therein. Here, for database retrieval, the above-mentioned retrieval key is used. (2) A retrieval key is provided by the content receiving terminal, and data as a result of database retrieval using the retrieval key is returned thereto.

In the content management system as above, described now is the operation of content moving via the copyright protection medium 103, separately (1) to the copyright protection medium 103, and (2) from the copyright protection medium 103.

Referring to the flowchart of FIG. 7, described first is the operation at the time of content moving to the copyright protection medium 103.

(Step S701)

The user selects content from many of those on the e-book content receiving terminal 102 which he/she wants to move to the copyright protection medium 103. The content thus designated by the user is presumably assigned with a content identifier Ic.

(Step S702)

Then, the content moving section 106 moves the designated content to the copyright protection medium 103. Specifically, first, the database in the content management section 109 is searched for the corresponding encrypted content using the content identifier Ic as a key. In the below, the content assigned with the content identifier Ic is expediently referred to as a content Ic. Thus retrieved encrypted content is then moved to the copyright protection medium 103. Here, as having been encrypted, no security is required for the content to move to the copyright protection medium 103. The content Ic has been also encrypted, and thus either of the secret region and the normal region of the copyright protection medium 103 will be its destination.

(Step S703)

After completion of content writing, the content moving section 106 acquires a media identifier uniquely assigned to the copyright protection medium 103. The acquisition result is presumably a media identifier Im.

(Step S704)

The content moving section 106 then forwards the content identifier Ic, and the media identifier Im which is acquired from the copyright protection medium 103 to the right management section 107 in the confidential process section 108. In response, the right management section 107 generates a retrieval key to register the usage rules in the usage rule management server 104. The retrieval key is generated as below. That is, (1) the right management section 107 searches for a content key for the content Ic using the received content identifier Ic. (2) Assuming that the content key Kc is found as a searching result, the content key Kc is used to encrypt the media identifier Im under symmetric key cryptography. The encrypted result is presumably Kc (Im), and Kc (Im) is used as a retrieval key. FIG. 8 shows a schematic process flow diagram of generating the retrieval key.

(Step S705)

The communications section 105 transmits, to the usage rule management server 104, the set of the retrieval key Kc(Im) generated in step S704, the usage rules Uc of the content Ic, and the content identifier Ic. Prior to transmission, a session key Ks is generated under the SSL protocol for mutual authentication and secure communications between the e-book content receiving terminal 102 and the usage rule management server 104. The terminal and the server are both provided with the same session key. Then, the communications section 105 encrypts transmission data (Kc (Im), Uc, and Ic) under symmetric key cryptography using the session key Ks for transmission to the usage rule management server 104. Here, the usage rules Uc in the transmission data are presumably not those defined as movable in the correspondence table (FIG. 5) provided to the content moving section 106.

(Step S706)

Using the session key Ks, the usage rule management server 104 decrypts the data received from the communications section 105 under symmetric key cryptography. Then, the usage rules Uc and the content identifiers Ic are registered in the database in the server using the retrieval key Kc(Im) as the retrieval key of the database.

(Step S707)

The content moving section 106 moves the usage rules Uc of the content Ic to the copyright protection medium 103. The content moving section 106 is provided with the correspondence table (FIG. 5) between the usage rules defined by the e-book format of the copyright protection medium 103 and those defined by the e-book distribution services. The content moving section 106 refers to the correspondence table (FIG. 5) to move only the usage rules allowed to move.

As a result, at the time of content moving to the copyright protection medium 103, out of many usage rules set to a content, those defined by the copyright protection medium 103 are moved to the copyright protection medium 103, and those not defined by the copyright protection medium 103 are transmitted to the usage rule management server 104 through the communications section 105.

Figure 9:
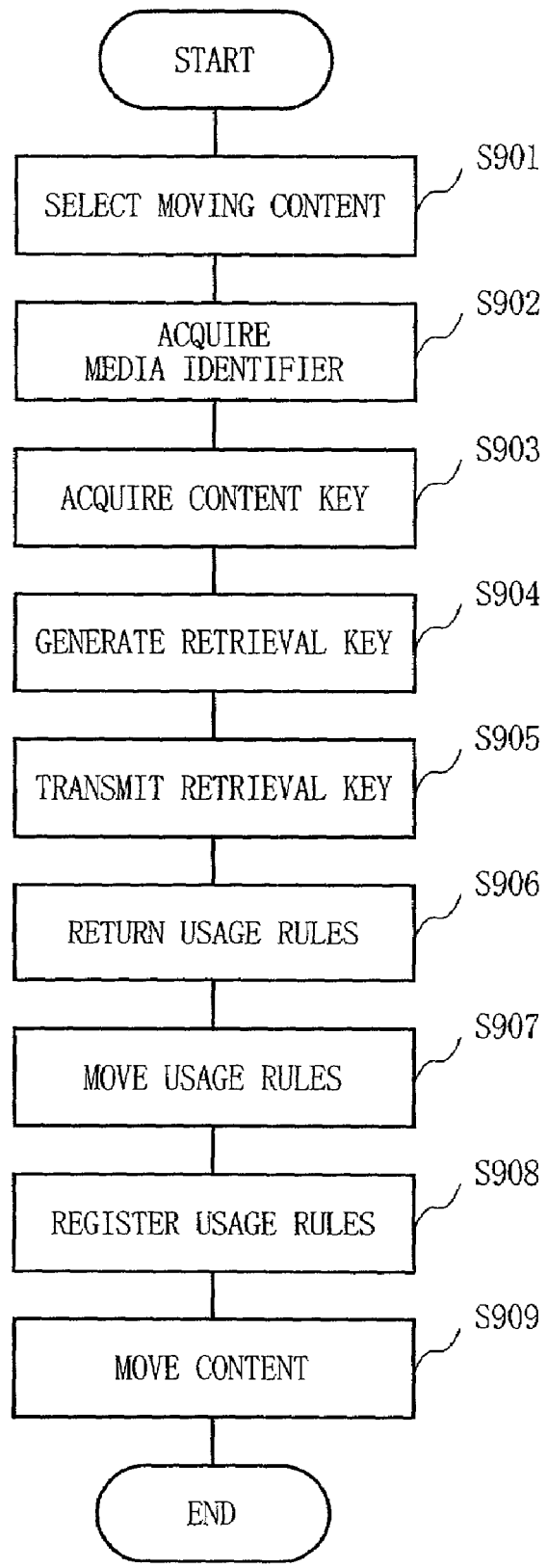
FIG. 9 is a flowchart showing the operation at the time of content moving from the copyright protection medium of the first embodiment.

Referring to the flowchart of FIG. 9, described next is the operation at the time of content moving from the copyright protection medium 103.

(Step S901)

The user selects a content from many of those on the copyright protection medium 103 which he/she wants to move to the e-book content receiving terminal 102. The content thus designated by the user is presumably assigned with a content identifier Ic'.

(Step S902)

A media identifier of the copyright protection medium 103 is acquired. The acquisition result is presumably a media identifier Im.

(Step S903)

The content moving section 106 acquires a content key Kc of the designated content Ic'.

(Step S904)

The content moving section 106 generates a retrieval key for acquiring the usage rules from the usage rule management server 104 using the media identifier Im acquired in step S902 and the content key Kc acquired in step S903. The retrieval key is generated under symmetric key cryptography using the content key Kc to encrypt the media identifier Im. Here, the resulting retrieval key is presumably Kc(Im).

(Step S905)

The communications section 105 transmits the retrieval key Kc(Im) generated in step S904 to the usage rule management server 104. Prior to transmission, a session key Ks' is generated under the SSL protocol for mutual authentication and secure communications between the e-book content receiving terminal 102 and the usage rule management server 104. Then, the communications section 105 encrypts transmission data (Kc(Im)) using the session key Ks' for transmission to the usage rule management server 104.

(Step S906)

Using the session key Ks', the usage rule management server 104 decrypts the data received from the communications section 105, and searches for the database in the server using the retrieval key Kc(Im). Then, the usage rule management server 104 returns the retrieved result (Uc, Ic) to the e-book content receiving terminal 102.

(Step S907)

The content moving section 106 moves the usage rules Uc' for the content Ic' from the copyright protection medium 103. At the time of content moving, the correspondence table (FIG. 5) provided thereto is referred to, and the usage rule identifiers and the attribute values are converted.

(Step S908)

The communications section 105 combines the usage rules Uc received from the usage rule management server 104 together with the usage rules moved in step S907, and then in the right management section 107, registers the resulting combined usage rules, the content identifier Ic received from the usage rule management server 104, and the content key Kc acquired from the copyright protection medium 103 in step S903.

(Step S909)

Then, the content moving section 106 moves the content Ic' from the copyright protection medium 103 to the content management section 109. The moved content is then registered in the database in the content management section 109 together with the content identifier Ic received from the usage rule management server 104.

As a result, at the time of content moving from the copyright protection medium 103, out of many usage rules initially set to a content, those defined by the copyright protection medium 103 are moved from the copyright protection medium 103, and those not defined by the copyright protection medium 103 are provided by the usage rule management server 104 through the communications section 105. In this manner, no usage rule will be lost even if the content is moved via the copyright protection medium 103, whereby all of the usage rules are moved without fail.

In the present embodiment, used as a retrieval key for the usage rule management server 104 is Kc(Im), which is a result of encrypting the media identifier Im using the content key Kc. This is not restrictive, and any other will do as long as uniquely identifiable the contents on the copyright protection medium 103. For example, if the copyright protection medium 103 never fails to separately generate the content identifier Ic responding to content writing, the retrieval key may be Ic·Im which is the combination of the content identifier Ic and the media identifier Im.

If the destination terminal of the content is predetermined, the usage rules Uc to be registered in the usage rule management server 104 may be encrypted by a public key of the destination terminal.

In the present embodiment, the usage rule management server 104 receives only the usage rules which are not movable to the copyright protection medium 103. Alternatively, every usage rule found in the ticket may be transmitted to the usage rule management server 104. If this is the case, the process of step S907 in FIG. 9 can be omitted.

Further, in the present embodiment, all of the communications section 105, the content moving section 106, and the right management section 107 are included in the same confidential process section 108. Alternatively, those constituents may independently have their own confidential process sections on a module basis. In such a case, the confidential process sections are supposed to carry out secure communications after mutual authentication to stop data eavesdropping among modules by malicious users.

The e-book content distribution server 101 and the usage rule management server 104 in the present embodiment may be physically implemented on the same server.

Still further, in the present embodiment, the e-book content distribution server 101 is in charge of content and ticket distribution. Alternatively, the server may be independently provided each for content distribution and ticket distribution.

The usage rule management section 104 may be provided with a function of keeping the history of the e-book content receiving terminal 102 and the content identifier through content moving, so that any unauthorized content uses can be monitored thereby. If so, in an exemplary case where the content of the same identifier is moved for a plurality of times from the same e-book content receiving terminal 102, the usage rule management server 104 becomes capable of detecting that, and warning the user of the content receiving terminal.

Still further, in the present embodiment, exemplified is a case where contents are moved among the e-book content receiving terminals 102 via the copyright protection medium 103. The present invention is surely applicable also to a case where the contents are moved via any other content management systems or content distribution systems with a copyright protection function. That is, the usage rules are often lost when content moved through a certain content distribution system is again moved this time through another system (not limited to the copyright protection system) in which usage rules of the content are not fully defined. The present invention is fully applicable to such cases.

Still further, the usage rules are combined by the e-book content receiving terminal 102 in the present invention, but the usage rule management server 104 may do so. In this case, the e-book content receiving terminal 102 uses the session key Ks' to encrypt the usage rules Uc' moved from the copyright protection medium 103 together with the retrieval key Kc(Im), and transmits the result to the usage rule management server 104. Then, the usage rule management server 104 searches for the database in the server using the retrieval key Kc(Im). Assuming that the retrieval result is (Uc, Ic), the usage rule management server 104 combines the usage rules Uc together with the usage rules Uc' received from the terminal, and then uses the session key Ks' to encrypt the combined usage rules and the content identifier Ic for sending back to the e-book content receiving terminal 102. Thereafter, the e-book content receiving terminal 102 registers in the right management section 107 the combined usage rules received from the usage rule management server 104, the content identifier Ic, and the content key Kc acquired from the portable medium 103.

Second Embodiment

Described next is a second embodiment of the present invention.

In the above first embodiment, the usage rules which are not defined by the e-book format of the copyright protection medium 103 are moved by means of the usage rule management server 104, thereby preventing loss of the usage rules at the time of content moving. In the present invention, the usage rules which are not defined by the e-book format of the copyright protection medium 103 are encrypted, and then moved to the normal region of the copyright protection medium 103, thereby realizing same level of capability.

Figure 10:
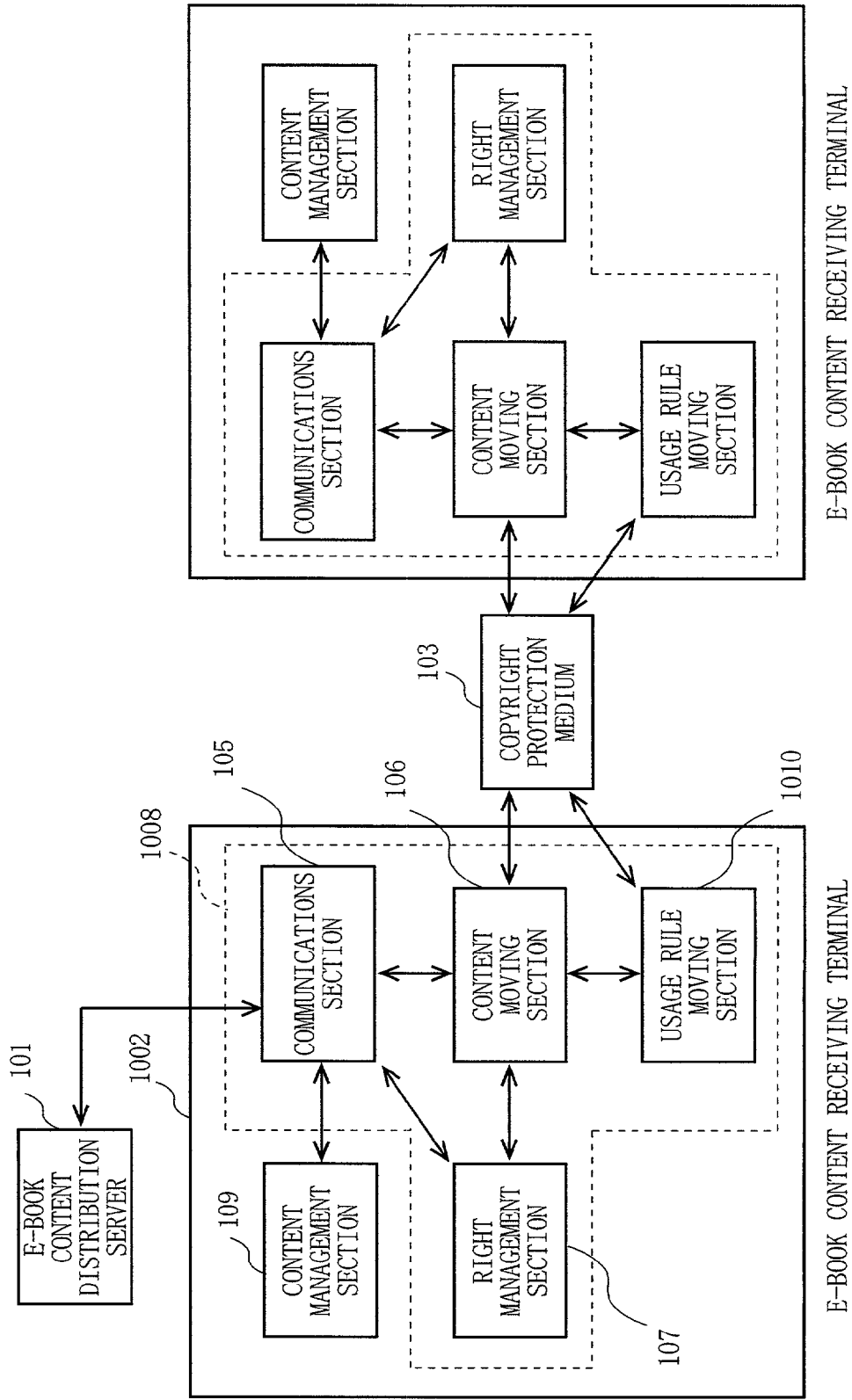
FIG. 10 is a block diagram showing the structure of a content management system according to a second embodiment of the present invention.

FIG. 10 is a block diagram showing the structure of a content management system according to a second embodiment of the present invention. In FIG. 10, the content management system includes the e-book content distribution server 101, an e-book content receiving terminal 1002, and the copyright protection medium 103. The e-book content receiving terminal 1002 includes a confidential process section 1008, and the content management section 109, and the confidential process section 1008 includes the communications section 105, the content moving section 106, the right management section 107, and a usage rule moving section 1010. Here, in FIG. 10, any constituent identical to that of FIG. 1 is under the same reference numeral, and not described again.

The usage rule moving section 1010 is located in the confidential process section 1008 in the e-book content receiving terminal 1002, and provided with a function of encrypting the usage rules Uc stored in the right management section 107, and moving the encrypted result to the copyright protection medium 103. It should be noted that the usage rules moved here are different from those moved from the content moving section 106 to the copyright protection medium 103. As already described in the first embodiment, the content moving section 106 moves only the usage rules defined by the copyright protection medium 103, and a moving destination thereof is the secret region of the copyright protection medium 103. On the other hand, the usage rule moving section 1010 moves the usage rules which are not defined by the copyright protection medium 103 to the normal region in the copyright protection medium 103.

In such a content management system, described now is the operation of content moving via the copyright protection medium 103, separately (1) to the copyright protection medium 103, and (2) from the copyright protection medium 103.

Figure 11:
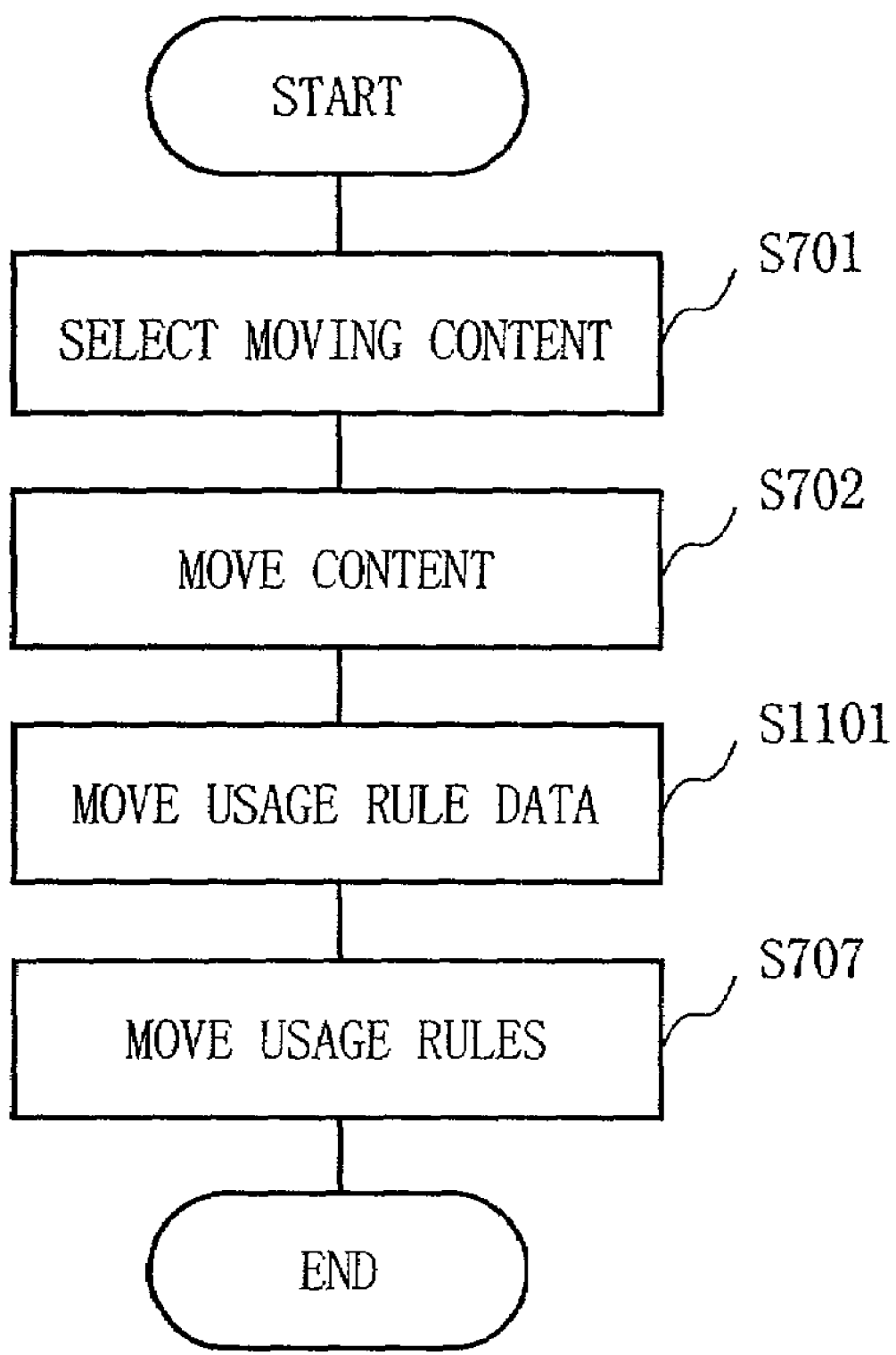
FIG. 11 is a flowchart showing the operation at the time of content moving to a copyright protection medium of the second embodiment.

Referring to the flowchart of FIG. 11, described first is the operation at the time of content moving to the copyright protection medium 103. In FIG. 11, any step identical to that of FIG. 7 is provided with the same step number, and not described again.

(Step S1101)

The usage rule moving section 1010 encrypts the usage rules Uc and the content identifier Ic, which are those moved in step S702, under symmetrical key cryptography using the content key Kc, and moves the result to the normal region of the copyright protection medium 103. Here, the resulting encrypted data moved to the normal region is referred to as usage rule data Dc. The usage rules Uc in the usage rule data Dc are presumably not those defined as movable by the correspondence table (FIG. 5) of the content moving section 106.

The usage rule data Dc moved to the copyright protection medium 103 needs to be associated with the content Ic. In order to establish such an association, for example, the data Dc and the content Ic may be provided with the same filename (with different extensions). Specifically, when the content Ic on the copyright protection medium 103 has a file name of "A. SB1", the usage rule data Dc may have a file name of "A. UR".

As a result of the process shown in FIG. 11, at the time of content moving to the copyright protection medium 103, out of many usage rules set to a content, those defined by the copyright protection medium 103 are moved to the secret region of the copyright protection medium 103, and those not defined by the copyright protection medium 103 are encrypted and transmitted to the normal region of the copyright protection medium 103.

Figure 12:
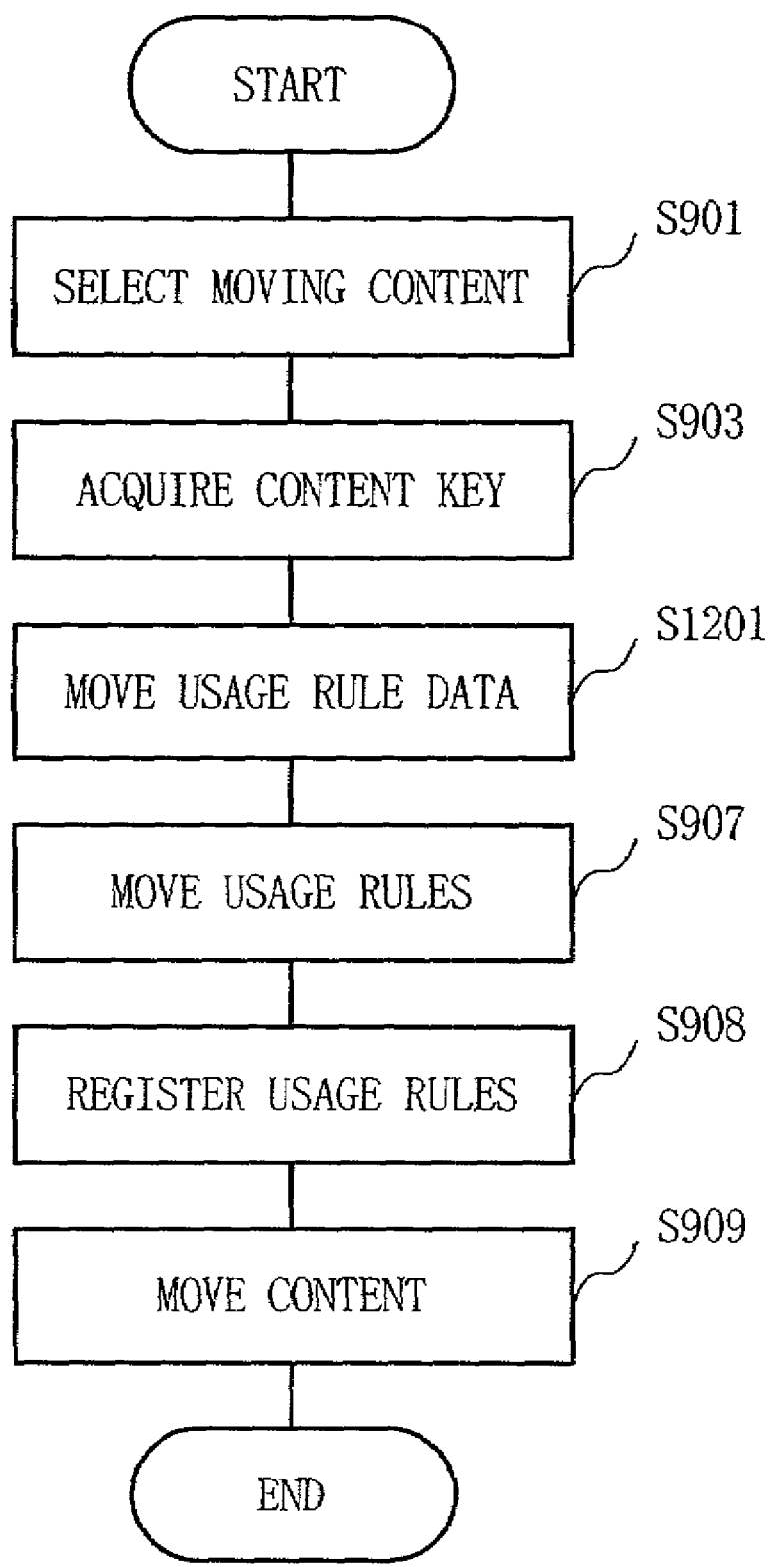
FIG. 12 is a flowchart showing the operation at the time of content moving from the copyright protection medium of the second embodiment.

Referring to the flowchart of FIG. 12, described next is the operation at the time of content moving from the copyright protection medium 103. In FIG. 12, any step identical to that of FIG. 9 is provided with the same step number, and not described again.

(Step S1201)

The usage rule moving section 1010 moves the usage rule data Dc corresponding to a content Ic' located in the normal region of the copyright protection medium 103, and decrypts the usage rule data Dc using the content key Kc acquired in step S903. Here, the set of the decrypted usage rules and the content identifier is (Uc, IC).

As a result of the process shown in FIG. 12, at the time of content moving from the copyright protection medium 103, out of many usage rules initially set to content, those defined by the copyright protection medium 103 are moved from the secret region of the copyright protection medium 103, and those not defined by the copyright protection medium 103 are encrypted and moved from the normal region of the copyright protection medium 103. In this manner, no usage rule will be lost even if the content is moved via the copyright protection medium 103, whereby all of the usage rules are moved without fail.

In the present embodiment, the usage rule Dc is encrypted using the content key Kc. Alternatively, if the destination terminal of the content is predetermined, encryption under asymmetric key cryptography using a public key of the destination terminal is an option.

In the present embodiment, the usage rule data Dc is encrypted and moved to the normal region of the copyright protection medium 103. This is not restrictive, and the moving destination may be the secret region of the copyright protection medium 103.

Further, in the present embodiment, the copyright protection medium 103 receives the usage rule data Dc including the encrypted usage rules which are not movable to the copyright protection medium 103 as they are. Alternatively, every usage rule found in the ticket may be encrypted and moved to the copyright protection medium 103 as the usage rule data Dc.

Further, in the present embodiment, all of the communications section 105, the content moving section 106, the right management section 107, and the usage rule moving section 1010 are included in the same confidential process section 1008. Alternatively, those constituents may independently have their own confidential process sections on a module basis. In such a case, the confidential process sections are supposed to carry out secure communications after mutual authentication to stop data eavesdropping among modules by malicious users.

Still further, in the present embodiment, exemplified is a case where contents are moved among the e-book content receiving terminals 102 via the copyright protection medium 103. The present invention is surely applicable also to a case where the content are moved via any other content management systems or content distribution systems with a copyright protection function. That is, the usage rules are often lost when a content moved through a certain content distribution system is again moved this time through another system (not limited to the copyright protection system) in which usage rules of the content are not fully defined. The present invention is fully applicable to such cases.

In the first and second embodiments, the two manners described above may be accordingly changed for content moving, depending on one of, at least, the content receiving terminal as the moving destination, moving contents, types of the moving contents, availability of means for communicating with the usage rule management server, and free space of the copyright protection medium, or the combination of those.

Note that, described in the above embodiments is the system for managing e-book contents. The e-contents are not restrictive, and the present invention is surely applicable to systems for managing any other contents, e.g., music contents, video contents.

While the invention has been described in detail, the foregoing description is in all aspects illustrative and not restrictive. It is understood that numerous other modifications and variations can be devised without departing from the scope of the invention.

What is claimed is:

1. A content management system in which a set of usage rules of content under management of a content management terminal are converted and temporarily moved to an intermediate system, and then moved to and converted by the same content management terminal or another content management terminal, wherein
the set of usage rules of the content comprises at least one usage rule, and the at least one usage rule is either relevant or irrelevant to an intermediate system, the content management system comprising:
the content management terminal; and
a usage rule holding region operable to temporarily hold any of usage rules which are not relevant to the intermediate system, wherein
the content management terminal includes:
a content management section operable to manage the content;
a right management section operable to manage the set of usage rules of the content;
a determination section operable to determine whether usage rules, included in the set of usage rules of the content, are relevant or irrelevant to the intermediate system;
a usage rule moving section operable to (i) convert, to a format of the intermediate system, and move, to a region of the intermediate system, from among the set of usage rules of the content, at least any of the relevant usage rules which are determined by the determination section, and (ii) move, to the usage rule holding region, which is different than the region of the intermediate system, from among the set of usage rules of the content, at least any of the irrelevant usage rules which are determined by the determination section;
a content moving section operable to move the content under management of the content management section to the intermediate system, and
the content management terminal, to which the relevant usage rules of the content are moved from the intermediate system, is operable to acquire the set of usage rules of the content based on at least one of any usage rule of the content moved from the intermediate system and any usage rule of the content held in the usage rule holding region.

2. The content management system according to claim 1, wherein
the intermediate system is a portable recording medium.

3. The content management system according to claim 2, wherein
the usage rule holding region is a storage region of the portable recording medium.

4. The content management system according to claim 3, wherein
the portable recording medium includes a secret region which is accessible only when mutual authentication is through with the portable recording medium, and a normal region which is accessible without the mutual authentication,
the usage rule holding region is the normal region of the portable recording medium, and
the usage rule moving section is operable to encrypt at least any of the irrelevant usage rules, and move an encrypted result to the normal region as usage rule data.

5. The content management system according to claim 3, wherein
the portable recording medium includes a secret region which is accessible only when mutual authentication is through with the portable recording medium, and a normal region which is accessible without the mutual authentication,
the usage rule holding region is the secret region of the portable recording medium, and
the usage rule moving section is operable to move, to the secret region, at least any of the irrelevant usage rules.

6. The content management system according to claim 1, wherein
the usage rule holding region is a usage rule management server which is connectable to the content management terminal over a network, and the usage rule moving section includes a communications section which is provided with a secure communications function with the usage rule management server.

7. A content management terminal used in a content management system, in which a set of usage rules of content under management of a content management terminal are converted and temporarily moved to an intermediate system, and then moved to and converted by the same content management terminal or another content management terminal, wherein the set of usage rules of the content comprises at least one usage rule, and the at least one usage rule is either relevant or irrelevant to an intermediate system, the content management terminal comprising:

a content management section operable to manage the content;

a right management section operable to manage the set of usage rules of the content;

a determination section operable to determine whether usage rules, included in the set of usage rules, are relevant or irrelevant to the intermediate system;

a usage rule moving section operable to (i) convert, to a format of the intermediate system, and move, to a region of the intermediate system, from among the set of usage rules of the content, at least any of the relevant usage rules which are determined by the determination section, and (ii) move, to the usage rule holding section, which is different than the region of the intermediate system, from among the set of usage rules of the content, at least any of the irrelevant usage rules which are determined by the determination section;

a content moving section operable to move the content under management of the content management section to the intermediate system, and the content management terminal, to which the relevant usage rules of the content are moved from the intermediate system, is operable to acquire the set of usage rules of the content based on at least one of any usage rule of the content moved from the intermediate system and any usage rule of the content held in the usage rule holding region.

8. A usage rule management server used in a content management system, in which a set of usage rules of the content under management of content management terminal are converted and temporarily moved to an intermediate system, and then moved to and converted by the same content management terminal or another content management terminal, the usage rule management server being connectable with the content management terminal over a network, wherein the set of usage rules of the content comprises at least one usage rule, and the at least one usage rule is either relevant or irrelevant to an intermediate system, the usage rule management server comprising:

a database registration section operable to receive, under secure communications, from among the set of usage rules of the content, at least any of the usage rules which are not relevant to the intermediate system, and register any received usage rules in a database; and a database retrieval section operable to search the database for any usage rules of the content which are irrelevant to the intermediate system in response to a request from the content management terminal to which the content is moved from the intermediate system, and notify a retrieval result to the content management terminal.

9. A content management method in which a set of usage rules of content under management of a content management terminal are converted and temporarily moved to an intermediate system, and then moved to and converted by the same content management terminal or another content management terminal, wherein the set of usage rules of the content comprises at least one usage rule, and the at least one usage rule is either relevant or irrelevant to an intermediate system, the content management method comprising:

a determination operation in the content management terminal, of determining whether usage rules, included in the set of usage rules of the content, are relevant or irrelevant to the intermediate system;

a usage rule moving operation, in the content management terminal, of (i) converting, to a format of the intermediate system, and moving to a region of the intermediate system, from among the set of usage rules of the content, at least any of the relevant usage rules which are determined by the determination operation and (ii) moving to the usage rule holding region, which is different than the region of the intermediate system, from among the set of usage rules of the content, at least any of the irrelevant usage rules which are determined by the determination operation;

a content moving operation, in the content management terminal, of moving the content managed in a content management section of the content management terminal to the intermediate system; and an acquiring operation, in the content management terminal, of acquiring the set of usage rules of the content based on at least one of any usage rule of the content moved from the intermediate system and any usage rule of the content held in the usage rule holding region.

10. The content management method according to claim 9, wherein the intermediate system is a portable recording medium.

11. The content management method according to claim 10, wherein the usage rule holding region is a storage region of the portable recording medium.

12. The content management method according to claim 11, wherein the usage rule holding region is a normal region of the portable recording medium, and the usage rule moving operation comprises encrypting at least any of the irrelevant usage rules, and moving an encrypted result as usage rule data to the normal region.

13. The content management method according to claim 11, wherein the usage rule holding region is a secret region of the portable recording medium, and the usage rule moving operation comprises moving, to the secret region, at least any of the irrelevant usage rules.

14. The content management method according to claim 9, wherein the usage rule holding region is a usage rule management server which is connectable to the content management terminal over a network, and the usage rule moving operation comprises moving, under secure communications, to the usage rule management server, at least any of the irrelevant usage rules.

15. A content management program on a readable medium for execution by a content management terminal in which a set of usage rules of content under management of the content management terminal are converted and temporarily moved to an intermediate system, and then moved to and converted by the same content management terminal or another content management terminal, wherein the set of usage rules of the content comprises at least one usage rule, and the at least one usage rule is either relevant or irrelevant to an intermediate system, the content management program comprising:

a determination operation of determining whether usage rules, included in the set of usage rules of the content, are relevant or irrelevant to the intermediate system;

a usage rule moving operation of (i) converting, to a format of the intermediate system, and moving, to a region of the intermediate system, from among the set of usage rules of the content, at least any of the relevant usage rules which are determined by the determination operation, and (ii) moving, to the usage rule holding region, which is different than the region of the intermediate system, from among the set of usage rules of the content, at least any of the irrelevant usage rules which are determined by the determination operation;

a content moving operation of moving the content managed in a content management section of the content management terminal to the intermediate system; and an acquiring operation of acquiring the set of usage rules of the content based on at least one of any usage rule of the content moved from the intermediate system, and any usage rule of the content held in the usage rule holding region.

* * * * *

UNITED STATES PATENT AND TRADEMARK OFFICE
CERTIFICATE OF CORRECTION

PATENT NO. : 7,110,543 B2  Page 1 of 1
APPLICATION NO. : 10/151031
DATED : September 19, 2006
INVENTOR(S) : Koji Miura et al.

It is certified that error appears in the above-identified patent and that said Letters Patent is hereby corrected as shown below:

In column 20, line 3, please replace "determination operation in" with --determination operation, in--.

In column 20, line 9, please replace "and moving to" with --and moving, to--.

In column 20, lines 12-13, please replace "determination operation and" with --determination operation, and--.

In column 20, line 13, please replace "and (ii) moving to" with --and (ii) moving, to--.

Signed and Sealed this

Twenty-third Day of January, 2007

JON W. DUDAS
*Director of the United States Patent and Trademark Office*